(12) United States Patent
Seigneret

(10) Patent No.: US 7,447,349 B2
(45) Date of Patent: Nov. 4, 2008

(54) METHOD AND A SYSTEM FOR PROCESSING DIGITAL IMAGES

(75) Inventor: Franck Seigneret, Tullins (FR)

(73) Assignee: STMicroelectronics SA, Montrouge (FR)

( * ) Notice: Subject to any disclaimer, the term of this patent is extended or adjusted under 35 U.S.C. 154(b) by 774 days.

(21) Appl. No.: 10/432,922

(22) PCT Filed: Nov. 22, 2001

(86) PCT No.: PCT/FR01/03677

§ 371 (c)(1),
(2), (4) Date: Oct. 27, 2003

(87) PCT Pub. No.: WO02/45026

PCT Pub. Date: Jun. 6, 2002

(65) Prior Publication Data

US 2004/0061698 A1    Apr. 1, 2004

(30) Foreign Application Priority Data

Dec. 1, 2000    (FR) .................................. 00 15551

(51) Int. Cl.
*G06K 9/00*    (2006.01)

(52) U.S. Cl. ........................... 382/154; 345/419; 348/42

(58) Field of Classification Search ................. 382/154, 382/285; 345/419–427; 356/12–14; 348/42–60; 359/462–477

See application file for complete search history.

(56) References Cited

FOREIGN PATENT DOCUMENTS

EP    0875860    11/1998

OTHER PUBLICATIONS

William Dungan Jr, Anthony Stenger, George Sutty; Texture Tile Considerations for Raster Graphics; Aug. 1978; ACM SIGGRAPH Computer Graphics; vol. 12, Issue 3; p. 130-146.*

Simulated Bas-Relief Through Bump Mapping, IBM Technical Disclosure Bulletin, US, IBM Corp, New York, vol. 33, No. 6A, Nov. 1, 1990.

* cited by examiner

*Primary Examiner*—Aaron W Carter
(74) *Attorney, Agent, or Firm*—Lisa K. Jorgenson; Allen, Dyer, Doppelt, Milbrath & Gilchrist, P.A.

(57) ABSTRACT

A method for processing digital images includes generating a plurality of images of reduced size from a two-dimensional image, with the reduced sizes being different from each other. The reduced size images are stored in memory. A three-dimensional image is generated in real time from a frame provided with unit surfaces and from pixels chosen from the image and the reduced size images as a function of the orientation of a unit surface to which a pixel is to be assigned.

32 Claims, 3 Drawing Sheets

METHOD AND A SYSTEM FOR PROCESSING DIGITAL IMAGES

FIELD OF THE INVENTION

The present invention relates to processing digital images displayed on a screen, and in particular, on a computer screen or a television screen.

BACKGROUND OF THE INVENTION

Portable computer and telephone markets are currently merging, driven by the expansion of the Internet and interactive television which calls for associated technologies. It is therefore desirable to be able to display graphical images, such as World Wide Web pages distributed via the Internet or three-dimensional video game images, on a standard television screen with a level of visual comfort that is acceptable to the user. In particular, video game images are subject to a phenomenon known as "aliasing" which compromises image quality.

In a video game image a structure such as a tree, a vehicle or a building is generally defined by an array of triangles defining a contour of the structure and a texture at several scales. The scales are determined as a function of the orientation of each triangle. In a conventional video game running on a game console, all the textures are pre-stored at all the scales.

SUMMARY OF THE INVENTION

An object of the present invention is to provide a method for processing images enabling high-quality three-dimensional images suitable for broadcasting to a television screen. The high-quality three-dimensional images are preferably generated from a stream of data received by radio, by cable, by satellite, etc.

Another object of the present invention is to provide a method for processing images enabling three-dimensional images to be generated from the stream of data in real time.

These and other objects, advantages and features in accordance with the present invention are provided by a method for processing digital images comprising generating a plurality of images of reduced size from a two-dimensional image, with the reduced sizes being different from each other. The images of reduced size are transmitted to a 3D accelerator encapsulated in accordance with a predetermined structure, and the reduced size images are stored in memory by extracting the images from the encapsulated structure. The method further includes generating a three-dimensional image in real time from a frame provided with unit surfaces and from pixels chosen from the image and the reduced size images as a function of the orientation of a unit surface to which the pixel is to be assigned.

In other words, the preprocessed video is transferred to the 3D rendition operator. All the small images are encapsulated in a standard digital video signal in accordance with an X-Y placement convention. The standard can be of the ITU-RBT.656 type. The capture port of the 3D processor recovers the video and extracts from it the sequence of encapsulated images, which is stored in memory with an organization enabling the rendition operator to derive the best possible quality from the video source.

A reduced image is advantageously generated from the whole of an animated two-dimensional image. The reduced sizes are advantageously in geometrical progression. In one embodiment of the invention, the scale of the first reduced scale image is reduced by a factor of 2. In another embodiment of the invention the scale of the nth reduced scale image is reduced by a factor of $2^n$.

Storage in a memory is preferably effected in accordance with a particular writing order, and reading in the memory is also preferably effected in a particular order. The reduced size images are advantageously formatted inside the format of the image so that all of the reduced size images occupy less than or the same space as the image.

In one embodiment of the invention, the orientation of the unit surface to which the pixel will be assigned is defined by a vector normal to the unit surface. In another embodiment of the invention the three-dimensional image is stored in memory, or the three-dimensional image may be sent to a display system.

A central unit can be adapted to determine the orientation of the unit surface to which the pixel is to be assigned. A digital terminal can be adapted to generate the reduced-scale images in real time in animated video. An auxiliary unit can be adapted to assign a unit surface a pixel with corresponding coordinates chosen from one of the reduced-scale images or the 1/1 scale image. The image from which the pixel is taken is chosen as a function of the orientation of the corresponding unit surface.

Thus, a two-dimensional image transported in a stream of data is subjected to successive scale reductions to obtain a plurality of images of reduced size. The two-dimensional image to the original scale can be stored in memory with the reduced-size images. A three-dimensional image is generated in real time from a frame provided with unit surfaces, and pixels are chosen from the image to the original scale and the reduced-size images. The pixels are chosen as a function of the orientation of a unit surface to which the pixel is to be assigned.

The present invention also provides a system for processing digital images comprising a digital terminal, a central unit, a memory system and a display unit. The digital terminal includes a bit block processor module adapted to reduce the size of a two-dimensional image. The memory system is adapted to store a plurality of reduced size images derived from the two-dimensional image, and the reduced sizes are different from each other.

An auxiliary module associated with the digital terminal generates a three-dimensional image from a frame provided with unit surfaces and from pixels chosen from the two-dimensional image and the reduced size images from the bit block processing module. The choice is made as a function of the orientation of a unit surface to which the pixel is be assigned. The three-dimensional image is sent to the display unit.

In one embodiment of the invention the auxiliary module has a display output connected to the display unit. The auxiliary module also advantageously has a display output connected to the digital terminal. The central unit is advantageously able to determine the orientation of the unit surface to which the pixel is to be assigned. In other words, a 3D rendition circuit is introduced into a digital terminal to obtain real time images of high quality.

The invention enables a high-quality three-dimensional effect to be offered that is free of the aliasing artifacts that are a function of the orientation of the unit surfaces of the array defining the structure represented. Not only is the full-scale image used, but also the images to scales of 1/2, 1/4, etc., down to the scale of one pixel per unit surface. The use of reduced scale images enables filtering to be locally adapted as a function of the orientation of each unit surface relative to the display plane.

For example, a unit surface whose normal is at an angle to the display plane whose sine is from 1 to 0.75 is allocated a pixel from the 1/1 scale image. If the sine is from 0.75 to 0.375, the pixel assigned is from the 1/2 image. If the sine is from 0.375 to 0.1875, the pixel assigned is from the 1/4 scale image. If the sine is from 0.1875 to 0.09375, the pixel assigned is from the 1/8 scale image. If the sine is less than 0.09375, the pixel assigned is from the 1/16 scale image.

BRIEF DESCRIPTION OF THE DRAWINGS

The present invention will be better understood and other advantages will become apparent on reading the following detailed description of one embodiment of the invention, which is given by way of non-limiting examples only and illustrated by the accompanying drawings, in which.

DETAILED DESCRIPTION OF THE PREFERRED EMBODIMENTS

Figure 1:
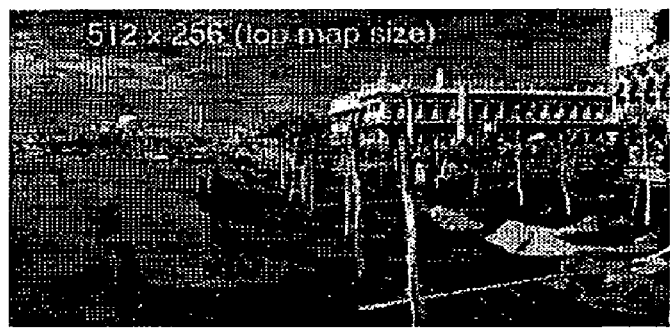
FIG. 1 shows an example of a full-scale two-dimensional image according to the present invention.

FIG. 1 shows one example of a full-scale two-dimensional image comprising 512×256 pixels.

Figure 2:
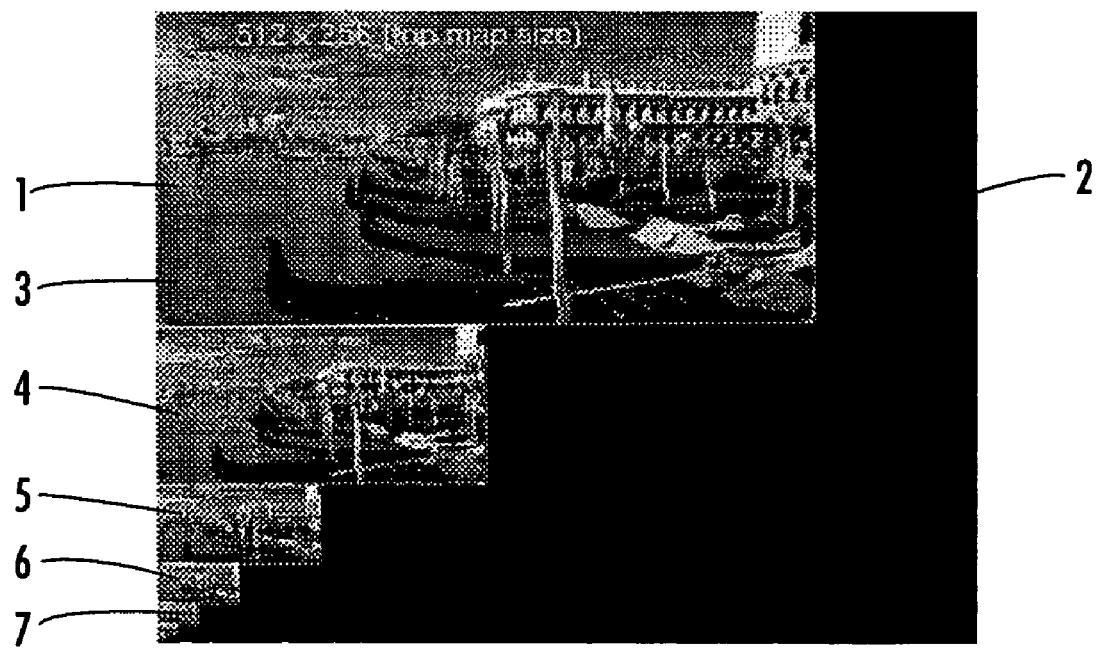
FIG. 2 shows a corresponding example of reduced scale two-dimensional images according to the present invention.

FIG. 2 shows the full-scale image 1, a 1/2 scale image 3, a 1/4 scale image 4, a 1/8 scale image 5, a 1/16 scale image 6 and a 1/32 scale image 7 placed in a predetermined format represented by the rectangle 2. The scaling applies both to the width and to the height of the image to change from any of these images to the image of the immediately next smaller format. Also, the quantity of pixels, i.e., the quantity of data, is reduced by a factor of 4 each time on changing from a scale of 1/2 to the power x to the scale of 1/2 to the power x+1.

The reduced format images 3 to 7 are generated from the image 1 by filtering, which can be of the type that takes one pixel in four, for example, one row in two and one column in two, or of the type that calculates an average of adjacent pixels, or a weighted average of a greater number of pixels. Thus, the image 3 is generated from FIG. 1 by filtering.

The image 4 is generated from the image 3 by filtering, which can be effected four times faster than the filtering of FIG. 1, because the number of pixels is four times less, and so on. It follows that the time for filtering the images 3 to 6 to generate the respective images 4 to 7 is on the order of one third of the time to filter the image 1 to generate the image 3. If a higher scale reducing factor is used, for example a factor of 3, the time is even further reduced, for example to a value on the order of 12.5%. Here the images 1 and 3 to 7 are disposed one-after the other from the first column and the first row left free by images of higher rank. The addressing for recovering the images is therefore particularly straightforward.

The video is then transmitted in accordance with the standard ITU-RBT.656 video protocol to a 3D rendering operator similar to the graphic accelerators used in PCs. However, for optimum memory storage, so that the memory space can be reduced, image 4 could be placed under image 1 and to the right of image 3, that is, from the first row left free by image 1 and the first column left free by image 3, and so on. In other words, a 3D controller is added to a digital terminal to obtain the maximum-benefit from it, in terms of image quality, when it manipulates animated video. For example, the program changes with 3D transition effects, such as page turning, explosion, tearing, etc.

Figure 3:
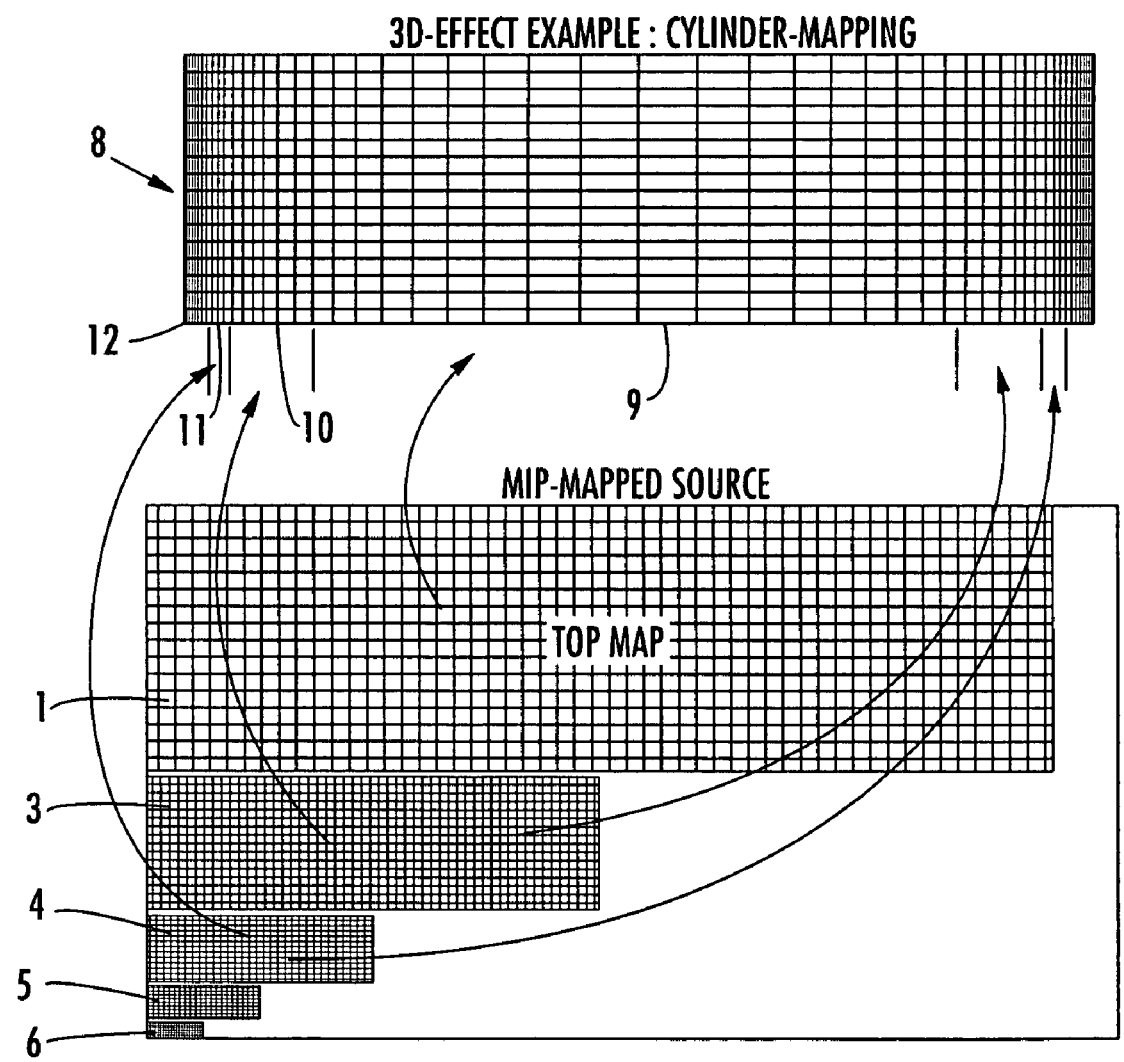
FIG. 3 is a diagram showing cylindrical three-dimensional reconstruction according to the present invention.

FIG. 3 shows a cylinder 8 with a vertical axis in the plane of the drawing onto which pixels are projected to obtain a three-dimensional image. The cylinder is divided into unit rectangles whose visible surface area is at a maximum when the rectangle is in the plane of the drawing, i.e., parallel to the screen on which the image is displayed, in other words when the normal of the rectangle is directed toward the user of the image, and increasingly small as the angle of the rectangle relative to the rectangle previously described increases, in other words as the normal of the rectangle approaches a plane parallel to the display screen.

Areas 9 to 12 are defined on the surface of the cylinder 8 in accordance with this criteria. The area 9 comprises unit rectangles substantially parallel to the plane of the display screen, and area 12 comprises unit rectangles substantially orthogonal to the display plane. A distribution with a greater number of areas could have been provided. However, to clarify the image, they are limited here to four. Area 9 is filled with pixels to the 1/1 scale from image 1. Area 10 is filled with pixels with coordinates corresponding to the 1/2 scale of image 3. Area 11 is filled with pixels with coordinates corresponding to the 1/4 scale of area 4, and area 12 is filled with pixels with coordinates corresponding to the 1/8 scale from area 5, and so on if a greater number of areas is provided.

Figure 4:
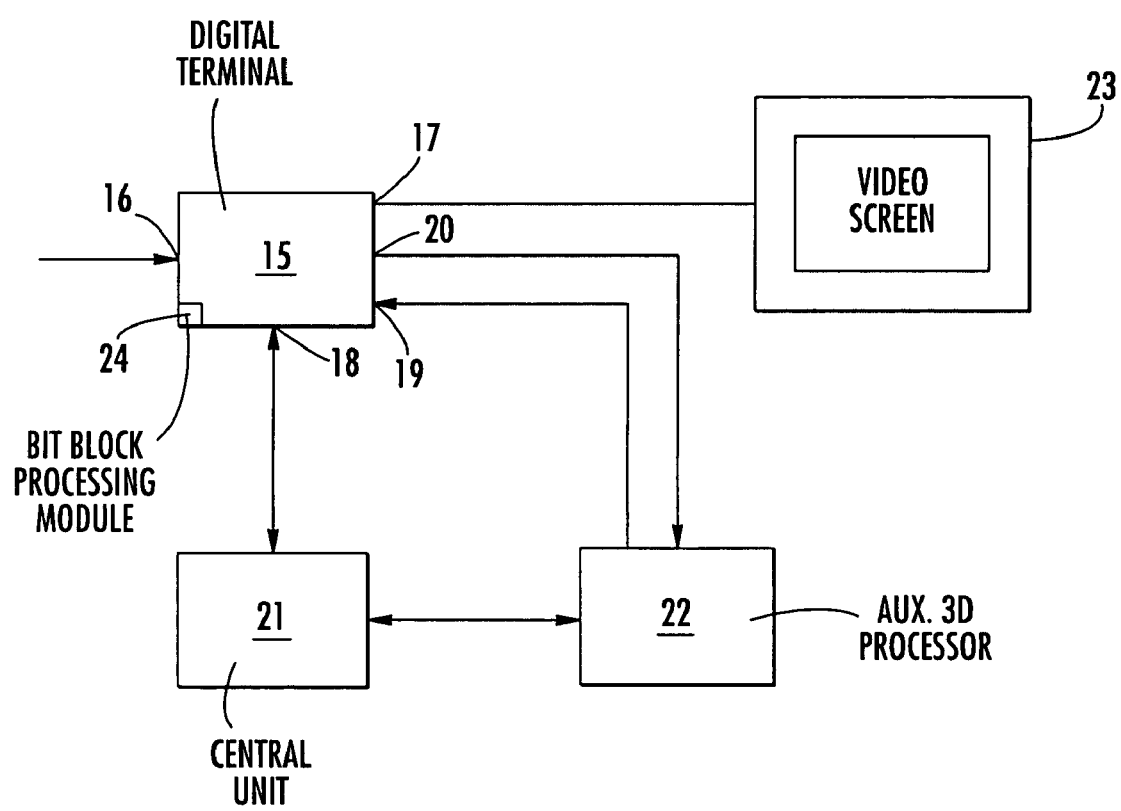
FIG. 4 is a diagram of a system according to one aspect of the present invention.

The processor system shown in FIG. 4 includes a digital terminal 15 with an input port 16, a video output port 17 and communication ports 18, 19 and 20, a central unit 21 able to communicate with the port 18 of the digital terminal 15, and an auxiliary three-dimensional processor unit 22 able to communicate with the central unit 21 and with the digital terminal 15 via the input port 19 and the output port 20.

The output port 17 of the digital terminal 15 is usually connected to a video screen 23, for example a television monitor, and in particular, a television monitor with interlaced scanning. The auxiliary unit 22 can optionally be provided with a VGA output, which is not shown.

From a stream of data relating to two-dimensional images arriving at the input port 16, the digital terminal 15 generates an image file of the FIG. 2 type and sends it via the output port 20 to the auxiliary unit 22. The central unit 21 receives the incoming stream of data via the digital terminal 15 and performs the geometrical calculations. In other words, for each unit surface, it calculates the angle of the normal vector to the surface and sends it to the auxiliary unit 22.

The auxiliary unit 22 then assembles the three-dimensional image in the manner explained with reference to FIG. 3. Knowing the angle of the normal vector to a unit surface, the auxiliary unit 22 determines which reduced or non-reduced image to use and assigns the corresponding pixel to the unit surface. The three-dimensional image ready for display is sent back to the digital terminal 15, which sends it via its output port 17 to the screen 23.

The invention applies particularly to generating transition effects between two applications, for example, a page-turning effect. This imparts a very high image quality to a broadcast video sequence, i.e., one not stored beforehand by the user, comparable to that of video games running on dedicated consoles, for which the images are stored in a memory of the console.

A decoder, for example an MPEG decoder and/or a decoder dedicated to descrambling, can be provided on the upstream side of the digital terminal 15 from FIG. 4, and may be preceded by a demodulator. To be more specific, the digital terminal 15 would be provided with a bit block processing module 24, for effecting the filtering needed to generate images on a reduced scale. Reduced format images from the output are placed in a memory with particular addressing arrangements, for example, so that images 3 to 7 are stored as shown in FIG. 2.

The invention claimed is:

1. A method for processing digital images comprising:
generating a plurality of reduced size images from a two-dimensional image, with each reduced size image being a scaled version of the two-dimensional image, and a size of each reduced size image being different from each other;
transmitting the plurality of reduced size images to a three-dimensional accelerator;
extracting the plurality of reduced size images from the three-dimensional accelerator and storing the plurality of reduced size images in a memory; and
generating a three-dimensional image in real time from a frame provided with unit surfaces and from pixels chosen from the two-dimensional image and the plurality of reduced size images as a function of an orientation of a unit surface to which a pixel is to be assigned.

2. A method according to claim 1, wherein the plurality of reduced size images are generated from a whole animated two-dimensional image.

3. A method according to claim 1, wherein the plurality of reduced size images are in a geometrical progression.

4. A method according to claim 1, wherein the plurality of reduced size images are stored in the memory in accordance with a particular writing order.

5. A method according to claim 1, further comprising reading the plurality of reduced size images from the memory in a particular order.

6. A method according to claim 1, wherein the plurality of reduced size images are formatted inside a format of the two-dimensional image so that each reduced size image occupies a space less than or equal to a space of the two-dimensional image.

7. A method according to claim 1, wherein the three-dimensional image is stored in the memory.

8. A method according to claim 1, further comprising displaying the three-dimensional image on a screen.

9. A method according to claim 8, wherein the screen comprises at least one of a computer screen and a television screen.

10. A method for processing digital images comprising:
generating a plurality of reduced size images from a two-dimensional image, with an image of each reduced size image being a scaled version of the two-dimensional image, and a size of each reduced size image being different from each other and the plurality of reduced size images being in a geometrical progression;
transmitting the plurality of reduced size images to a three-dimensional accelerator;
generating a three-dimensional image in real time from a frame provided with unit surfaces and from pixels chosen from the two-dimensional image and the plurality of reduced size images as a function of an orientation of a unit surface to which a pixel is to be assigned; and
displaying the three-dimensional image on a screen.

11. A method according to claim 10, wherein the plurality of reduced size images are generated from a whole animated two-dimensional image.

12. A method according to claim 10, wherein the plurality of reduced size images are stored in the memory in accordance with a particular writing order.

13. A method according to claim 10, further comprising reading the plurality of reduced size images from the memory in a particular order.

14. A method according to claim 10, wherein the plurality of reduced size images are formatted inside a format of the two-dimensional image so that each reduced size image occupies a space less than or equal to a space of the two-dimensional image.

15. A method according to claim 10, wherein the three-dimensional image is stored in the memory.

16. A method according to claim 10, wherein the screen comprises at least one of a computer screen and a television screen.

17. A system for processing digital images comprising:
a digital terminal having an input for receiving a two-dimensional image and comprising a bit block processor module for generating a plurality of reduced size images from the two-dimensional image;
a memory for storing the plurality of reduced size images, with each reduced size image being scaled with respect to the two-dimensional image, and a size of each reduced size image being different from each other;
an auxiliary processing unit connected to said digital terminal for generating a three-dimensional image from a frame provided with unit surfaces and from pixels chosen from the two-dimensional image and the plurality of reduced size images as a function of an orientation of a unit surface to which a pixel is to be assigned; and
a display for displaying the three-dimensional image.

18. A system according to claim 17, further comprising a central pressing unit connected to said digital terminal and to said auxiliary processing unit for determining the orientation of a unit surface to which a pixel is to be assigned.

19. A system according to claim 17, wherein said auxiliary processing unit comprises a display output for interfacing with said display.

20. A system according to claim 17, wherein said auxiliary processing unit comprises a display output for interfacing with said digital terminal.

21. A system according to claim 17, wherein said bit processing block module generates the plurality of reduced size images from a whole animated two-dimensional image.

22. A system according to claim 17, wherein said memory stores the plurality of reduced size images in a geometrical progression.

23. A system according to claim 22, wherein the plurality of reduced size images are formatted inside a format of the two-dimensional image so that each reduced size image occupies a space less than or equal to a space of the two-dimensional image.

24. A system according to claim 17, wherein said display comprises at least one of a computer screen and a television screen.

25. A system for processing digital images comprising:
a digital terminal having an input for receiving a two-dimensional image and comprising a bit block processor module for generating a plurality of reduced size images from the two-dimensional image, with each reduced size image being a scaled version of the two-dimensional image, and a size of each reduced size image being different from each other;
an auxiliary processing unit connected to said digital terminal for generating a three-dimensional image from a frame provided with unit surfaces and from pixels chosen from the two-dimensional image and the plurality of reduced size images as a function of an orientation of a unit surface to which a pixel is to be assigned;

a central processing unit connected to said digital terminal and to said auxiliary processing unit for determining the orientation of a unit surface to which a pixel is to be assigned; and a display for displaying the three-dimensional image.

26. A system according to claim 25, further comprising a memory for storing the plurality of reduced size images and the three-dimensional image.

27. A system according to claim 25, wherein said auxiliary processing unit comprises a display output for interfacing with said display.

28. A system according to claim 25, wherein said auxiliary processing unit comprises a display output for interfacing with said digital terminal.

29. A system according to claim 25, wherein said bit processing block generates the plurality of reduced size images from a whole animated two-dimensional image.

30. A system according to claim 26, wherein said memory stores the plurality of reduced size images in a geometrical progression.

31. A system according to claim 30, wherein the plurality of reduced size images are formatted inside a format of the two-dimensional image so that each reduced size image occupies a space less than or equal to a space of the two-dimensional image.

32. A system according to claim 25, wherein said display comprises at least one of a computer screen and a television screen.

* * * * *